(12) United States Patent
Van Bommel et al.

(10) Patent No.: US 12,209,716 B2
(45) Date of Patent: Jan. 28, 2025

(54) LIGHT EMITTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/016,032

(22) PCT Filed: Jul. 12, 2021

(86) PCT No.: PCT/EP2021/069277
§ 371 (c)(1),
(2) Date: Jan. 13, 2023

(87) PCT Pub. No.: WO2022/013130
PCT Pub. Date: Jan. 20, 2022

(65) Prior Publication Data
US 2023/0296212 A1    Sep. 21, 2023

(30) Foreign Application Priority Data

Jul. 16, 2020   (EP) ..................... 20186116

(51) Int. Cl.
*F21K 9/61*     (2016.01)
*F21K 9/232*    (2016.01)
(Continued)

(52) U.S. Cl.
CPC ............... *F21K 9/61* (2016.08); *F21K 9/232* (2016.08); *G02B 6/0006* (2013.01); *F21Y 2115/30* (2016.08)

(58) Field of Classification Search
CPC ........ F21K 9/61; F21K 9/232; F21Y 2115/30; F21Y 2113/20; F21Y 2113/30; F21Y 2115/10; G02B 6/0006
See application file for complete search history.

(56) References Cited

U.S. PATENT DOCUMENTS 8,953,926 B1 *   2/2015   Kelly ..................... F21V 7/04
                                               362/628
11,187,912 B2 *  11/2021  Wakabayashi ...... H01S 5/02253
(Continued)

FOREIGN PATENT DOCUMENTS

CN          103016989 A     4/2013
CN          103486476 A     1/2014
(Continued)

*Primary Examiner* — Peggy A Neils (57) ABSTRACT

A light emitting device (1) comprising an element (2) comprising a volumetric low scattering material, the element comprising opposite first and second light incoupling surfaces (21, 22) and a circumferential surface (23) extending between the first and second light incoupling surfaces, at least one red laser diode (3) configured to emit red laser light (31), and being arranged at one of the light incoupling surfaces such that the red laser light is coupled into the element through the said one of the first and second light incoupling surfaces, a collimator (4) arranged and configured to collimate the red laser light (31), at least one LED (5) configured to emit LED light, the LED being arranged at one light incoupling surface, such that the LED light is coupled into the element through the said incoupling surface, and the scattering material being configured to make the path of laser light visible.

15 Claims, 8 Drawing Sheets

(51) Int. Cl.
*F21V 8/00* (2006.01)
*F21Y 115/30* (2016.01)

(56) References Cited

U.S. PATENT DOCUMENTS

| | | |
|---|---|---|
| 2011/0025205 A1 | 2/2011 | Van Rijswick et al. |
| 2012/0169235 A1* | 7/2012 | Dassanayake .......... F21V 3/049 315/113 |
| 2012/0212931 A1* | 8/2012 | Kinoshita ............ G02B 6/0068 362/84 |
| 2013/0187528 A1* | 7/2013 | Bailey .................... F21K 9/232 313/111 |
| 2014/0355292 A1 | 12/2014 | Krause |
| 2015/0309235 A1* | 10/2015 | Kawaguchi .............. G02B 6/02 362/510 |
| 2017/0205031 A1 | 7/2017 | Xiang |

FOREIGN PATENT DOCUMENTS

| | | |
|---|---|---|
| JP | 2004342411 A | 12/2004 |
| WO | 2001040702 A1 | 6/2001 |
| WO | 2012080759 A2 | 6/2012 |
| WO | 2015069515 A1 | 5/2015 |
| WO | 2018202625 A1 | 11/2018 |
| WO | 2020083658 A1 | 4/2020 |

* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2021/069277, filed on Jul. 12, 2021, which claims the benefit of European patent application Ser. No. 20186116.8, filed on Jul. 16, 2020. These applications are hereby incorporated by reference herein.

FIELD OF THE INVENTION

The invention relates to a light emitting device comprising an element comprising a volumetric low scattering material, the element comprising opposite first and second light incoupling surfaces and a circumferential surface extending between and connecting the first and second light incoupling surfaces, at least one laser diode, and at least one LED.

BACKGROUND OF THE INVENTION

Incandescent lamps are being rapidly replaced by LED based lighting solutions. It is nevertheless appreciated by the user to have retrofit lamps which have the looks of an incandescent bulb. For this purpose, one can simply make use of the infrastructure for producing incandescent lamps based on glass and replace the filament with LEDs emitting white light. One of the known concepts is based on LED filaments placed in such a bulb. The appearances of these lamps are highly appreciated as they look highly decorative. It is also possible to use a filament shaped fiber and couple LED light into it.

For instance, CN 103016989 A describes an optical fiber-based filament incandescent lamp comprising a LED light source, an optical coupling system and a photoluminescent fiber. The optical coupling system couples the light emitted by the light source into the photoluminescent fiber, while the photoluminescent fiber converts the light source light to composite light being similar to the light of an incandescent lamp. The optical fiber comprises a diameter in the micrometer range and is bendable, thus mimicking a filament.

It is nevertheless still desired to make filament luminaires more decorative. For example, a sparkling appearance is highly desirable. A fire burning effect mimicking the glowing effect of a filament of an incandescent lamp is also desirable.

Furthermore, it is desired to provide such a luminaire which also has an improved brightness, and which may be manufactured at reduced costs compared to the existing solutions.

SUMMARY OF THE INVENTION

It is an object of the present invention to overcome these problems, and to provide a light emitting device with which a filament luminaire may be made more decorative, for example by providing a sparkling appearance or a fire burning effect mimicking the glowing effect of a filament of an incandescent lamp.

It is a further object of the invention to provide a light emitting device which also has an improved brightness, and which may be manufactured at reduced costs, especially compared to the existing solutions.

According to a first aspect of the invention, this and other objects are achieved by means of a light emitting device comprising an element comprising a volumetric low scattering material, the element comprising opposite first and second light incoupling surfaces and a circumferential surface extending between and connecting the first and second light incoupling surfaces, at least one red laser diode (LD) configured to, in operation, emit red laser light, and being arranged at one of the first and second light incoupling surfaces such that the red laser light is coupled into the element through the said one of the first and second light incoupling surfaces, a collimator arranged and configured to collimate the red laser light, at least one LED configured to, in operation, emit LED light, the at least one LED being arranged at one of the first and second light incoupling surfaces, such that the LED light is coupled into the element through the said one of the first and second light incoupling surfaces, and the volumetric low scattering material of the element being configured to make the path of laser light visible.

Thereby, and in particular in virtue of providing the light emitting device with a laser diode (LD), a collimator for collimating the laser light emitted by the LD and an element with a volumetric low scattering material into which the highly collimated laser light is coupled, a light emitting device is provided with which a fire burning effect is obtained by decorative speckle patterns mimicking the glowing effect of a filament of an incandescent lamp.

Furthermore, by combining the LD with LEDs, a light emitting device is provided which has an improved brightness and which is manufacturable at a lower cost, especially as compared to existing prior art solutions.

In an embodiment, the volumetric low scattering material is a solid material comprising particles of a size being less than $1/10$ of the wavelength of the red laser light.

Thereby, a light emitting device is provided with which the laser light emitted by the LD is predominantly scattered by Rayleigh scattering. This in turn provides for a light emitting device with an even sideways emission of light.

In an embodiment, the volumetric low scattering material is a solid material comprising particles of a size being larger than the wavelength of the red laser light.

Thereby, a light emitting device is provided with which the laser light emitted by the LD is predominantly scattered by Mie scattering. This in turn provides for a light emitting device with a particular good directional control of the emission of light.

In an embodiment the collimator is configured to provide the collimated red laser light with a collimation being less than one degree FWHM.

Thereby it is ensured that the laser light emitted by the LD has an increased visibility within the element.

In an embodiment the element is configured to make the collimated red laser light visible over at least a length L in the element, wherein L is at least 5 cm, at least 8 cm, at least 9 cm, or at least 10 cm.

Thereby it is ensured that the laser light emitted by the LD has a particularly good visibility within the element.

In an embodiment, the volumetric low scattering material is a plastic. Suitable plastics include polycarbonate and PMMA.

By using a plastic material, manufacturing costs may be lowered further.

Polycarbonate and PMMA are examples of plastics being especially durable and resistant to being broken down by the light coupled into the element.

In an embodiment, the volumetric low scattering material is a foam with light redirecting properties.

By using a foam with light redirecting properties, the weight of the light emitting device is lowered while still providing a robust and cost reduced light emitting device.

In an embodiment, the light emitting device further comprises at least one reflector arranged at the light incoupling surface of the element opposite to the light incoupling surface at which the red laser diode is arranged such as to reflect the red laser light emitted by the red laser diode back into the element.

The red laser light emitted by the red laser diode may be reflected back into the element in a direction back towards the red laser diode, or in a direction different from a direction back towards the red laser diode. Thereby, a light emitting device is provided with which various light patterns may be produced, which provides for a more versatile light emitting device. Furthermore, the provision of a reflector improves the visibility of the laser light in the element of volumetric low scattering material. Thereby, the effects obtained by means of the laser light are improved. If the red laser light emitted by the red laser diode may be reflected back into the element in a direction back towards the red laser diode, the visibility of the red laser light is furthermore increased by amplification.

In an embodiment, the at least one reflector and the red laser diode is positioned in such a way with respect to one another that the red laser light reflected by the at least one reflector propagates in a direction different from a direction opposite to the direction of propagation of the red laser light incident on the at least one reflector. For instance, the red laser light may be reflected by the at least one reflector in an angle of reflection ranging from 10 to 60 degrees.

Thereby, a light emitting device is provided with which more than one path of laser light through the volumetric low scattering material becomes visible, thus enabling mimicking more than one filament. This in turn makes it possible to produce even more different light patterns, which provides for an even more versatile light emitting device with a minimum of additional components being needed.

In an embodiment, the light emitting device further comprises at least one reflector arranged at the same light incoupling surface as the red laser diode and offset from the red laser diode.

Thereby, a light emitting device is provided with which several paths of laser light through the volumetric low scattering material become visible. This in turn makes it possible to produce even more different light patterns, which provides for a particularly versatile light emitting device with a minimum of additional components being needed.

In an embodiment, the element comprising a volumetric low scattering material comprises at least one section adapted for not scattering light.

The provision of a non-scattering section of the element enables providing a light emitting device with which more than one path of laser light through the volumetric low scattering material becomes visible. This in turn makes it possible to produce even more different light patterns, which provides for a more versatile light emitting device, while no additional components are needed.

In an embodiment, the element comprising a volumetric low scattering material comprises at least one section being covered by a cover or a coating.

By covering at least one section of the element, a light emitting device is provided with which more than one path of laser light through the volumetric low scattering material becomes visible. This in turn makes it possible to produce even more different light patterns, which provides for a more versatile light emitting device, with a minimum of additional components being needed.

In an embodiment, the element comprising a volumetric low scattering material is a light guide in which the LED light emitted by the plurality of LEDs may be reflected multiple times by total internal reflection, the light guide comprising a low scattering material. The light guide may be rod-shaped.

Thereby, a light emitting device is provided with which a coiled light effect may be obtained in a structurally very simple manner.

In an embodiment, the at least one LED is configured to, in operation, emit white LED light.

By combining the LD with white LEDs, a light emitting device is provided which has an improved brightness and which is particularly simple and thus manufacturable at a particularly low cost.

In an embodiment, the light emitting device comprises a plurality of LEDs configured to, in operation, emit blue and yellow LED light.

By combining the LD with blue and yellow LEDs, color variable LEDs are provided. Thereby, a light emitting device is provided which has an improved brightness and which is manufacturable at a lower cost as compared to existing prior art solutions.

In an embodiment, the light emitting device comprises a plurality of LEDs configured to, in operation, emit red, green and blue LED light.

By combining the LD with an RGB LED package, a light emitting device is provided which not only has an improved brightness and which is manufacturable at a lower cost as compared to existing prior art solutions, but which also provides for full spectral control.

In an embodiment, the light emitting device further comprises an at least partially light transmissive envelope at least partly enclosing at least the volumetric low scattering material.

This provides for a more robust and durable light emitting device.

In an embodiment, the element comprising a volumetric low scattering material is a rod-shaped element.

This provides for a light emitting device with a particularly simple structure, which in turn is particularly cheap to manufacture.

In an embodiment, the element comprising a volumetric low scattering material is a filament-shaped element.

This provides for a light emitting device, which nor only comprises a particularly simple structure, which in turn is particularly cheap to manufacture, but also has an improved versatility in terms of the variation in light patterns that may be produced.

The light emitting device may further comprise a base for connecting the light emitting device to a luminaire base and/or a luminaire socket.

The invention also relates to a luminaire comprising a light emitting device according to the invention. Such a luminaire may for instance be a light bulb, an incandescent lamp or a filament lamp.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
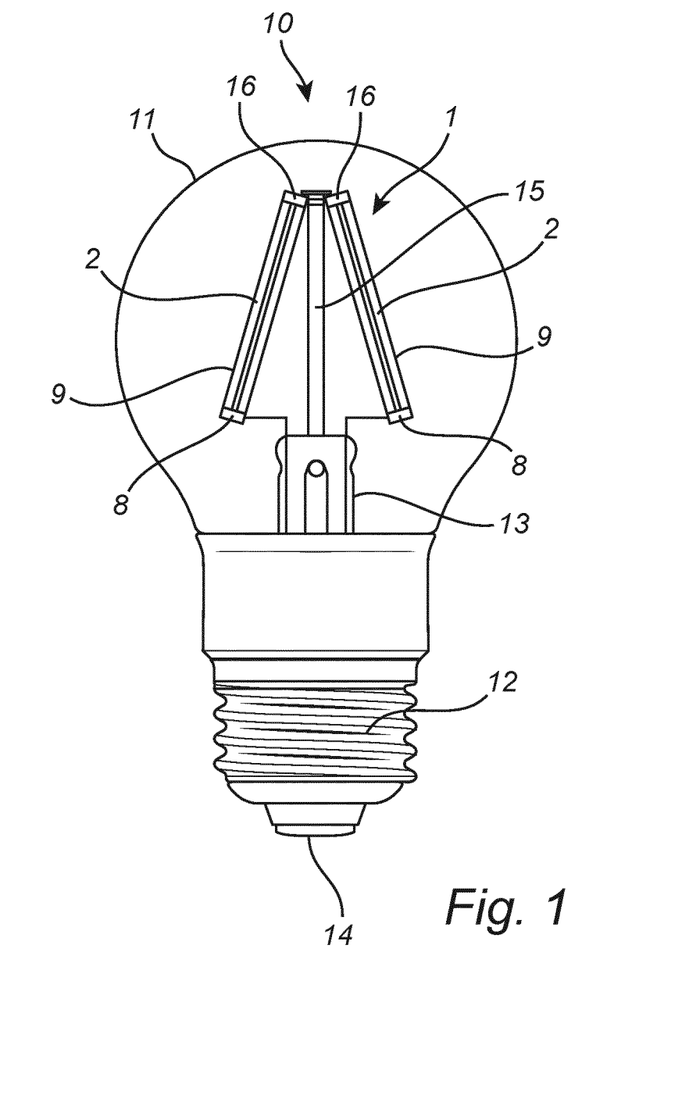
FIG. 1 shows a cross-sectional view of a light bulb with a light emitting device according to the invention.
Figure 2A:
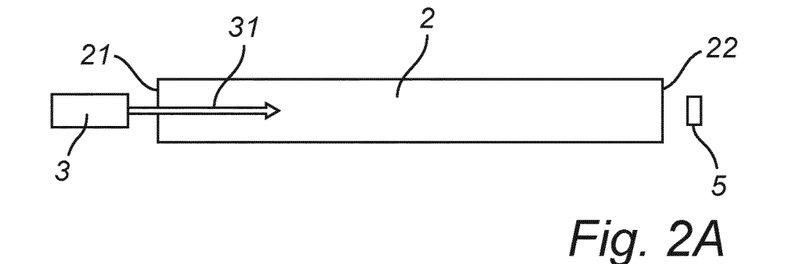
FIGS. 2A-2C show very schematic cross-sectional views of three embodiments of a light emitting device according to the invention and illustrating the positions of LED and LD light sources of the light emitting device.
Figure 2B:
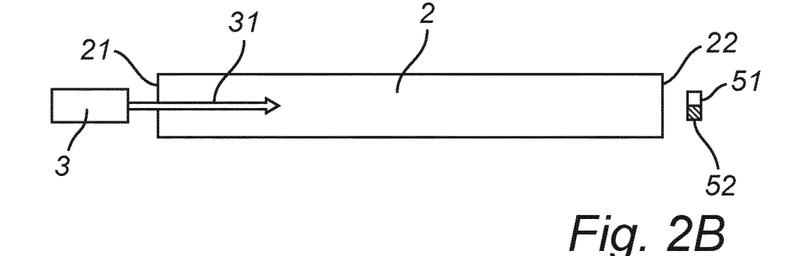
Figure 2C:
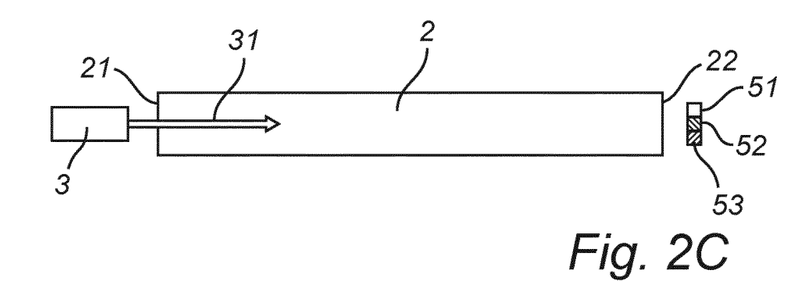
Figure 3:
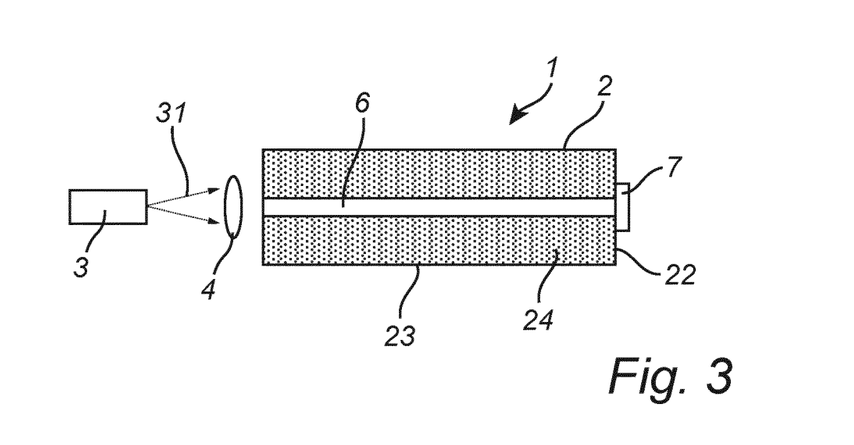
FIG. 3 shows a cross-sectional view of an embodiment of a light emitting device according to the invention comprising one reflector, the LEDs being omitted for simplicity.

Referring to FIGS. 1 to 3, a light emitting device 1 according to the invention is shown in cross-section. FIG. 1 shows the light emitting device 1 used in a light bulb 10. FIGS. 2A, 2B, 2C and 3 shows four different illustrative versions of the light emitting device 1 in cross-section.

Referring particularly to FIGS. 2A to 3, the light emitting device 1 generally, and irrespective of the embodiment, comprises an element 2 comprising a volumetric low scattering material, at least one red laser diode (LD) 3 configured to, in operation, emit red laser light 31, a collimating lens 4 arranged and configured to collimate the red laser light 31 and at least one LED 5, 51, 52, 53 configured to, in operation, emit LED light.

The element 2 comprises opposite first and second light incoupling surfaces 21 and 22 as well as a circumferential surface 23 extending between and connecting the first and second light incoupling surfaces 21 and 22. The circumferential surface 23 acts as a light outcoupling surface, through which light is coupled out of the element 2 by scattering. The element 2 is made of a volumetric low scattering material. The element 2 is configured to make a path 6 of laser light 31 light visible. The element 2 may also be configured to make a path of LED light visible. The element 2 may, but need not necessarily, be rod shaped. The element 2 may also, but need not necessarily, be filament-shaped.

The volumetric low scattering material of the element 2 may be a solid material. The volumetric low scattering material may comprise particles 24 (FIG. 3) of a size being less than 1/10 of the wavelength of the red laser light 31. Alternatively, or additionally, the volumetric low scattering material may comprise particles 24 of a size being larger than the wavelength of the red laser light 31. The particles 24 may be scattering particles. In yet another alternative the particles 24 may also be omitted. The volumetric low scattering material may be a plastic, for instance a polycarbonate or PMMA. The volumetric low scattering material may also be a foam with light redirecting properties.

The red LD 3 is configured to, in operation, emit red laser light 31. The red LD 3 is arranged at or adjacent to one of the first and second light incoupling surfaces 21 and 22. As shown on the figures, the LD 3 is arranged at the light incoupling surface 21, such that the red laser light 31 is coupled into the element 2 through the light incoupling surface 21. Alternatively, the LD 3 may be arranged at the light incoupling surface 22.

The collimator 4 is arranged at the said one of the first and second light incoupling surfaces 21 and 22, as shown the light incoupling surface 21, between the light incoupling surface 21 and the red LD 3. The collimator 4 may for instance be a collimating lens 4.

The at least one LED 5, 51, 52, 53 is arranged at, adjacent to or on one of the first and second light incoupling surfaces 21 and 22. As shown in FIGS. 2A-2C, the LD 3 is arranged at the light incoupling surface 21, and the at least one LED 5, 51, 52, 53 is arranged at the light incoupling surface 22, such that the LED light is coupled into the element 2 through the light incoupling surface 22. In other words, the at least one LED 5, 51, 52, 53 and the red LD 3 may be arranged at mutually opposite light incoupling surfaces 21, 22 of the element 2. If the LD 3 is arranged at the light incoupling surface 22, the LEDs 5, 51, 52, 53 may thus be arranged at the light incoupling surface 21. Alternatively, the LD 3 and the at least one LED 5, 51, 52, 53 may be arranged at the same light incoupling surface 21 or 22.

The at least one LED 5 may emit white light, cf. FIG. 2A. The at least one LED 51, 52 may also emit blue and yellow light, cf. FIG. 2B. The at least one LED 51, 52, 53 may also emit red, green and blue light, cf. FIG. 2C.

Referring particularly to FIG. 3, the light emitting device 1 further comprises a reflector 7. The reflector 7 is arranged at the light incoupling surface 22 of the element 2 opposite to the light incoupling surface 21 at which the red LD 3 is arranged such as to reflect the red laser light 31 emitted by the red LD 3 back into the element 2 in a direction back towards the red LD 3. Thereby the red LD light is amplified, and its visibility is increased.

Figure 4:
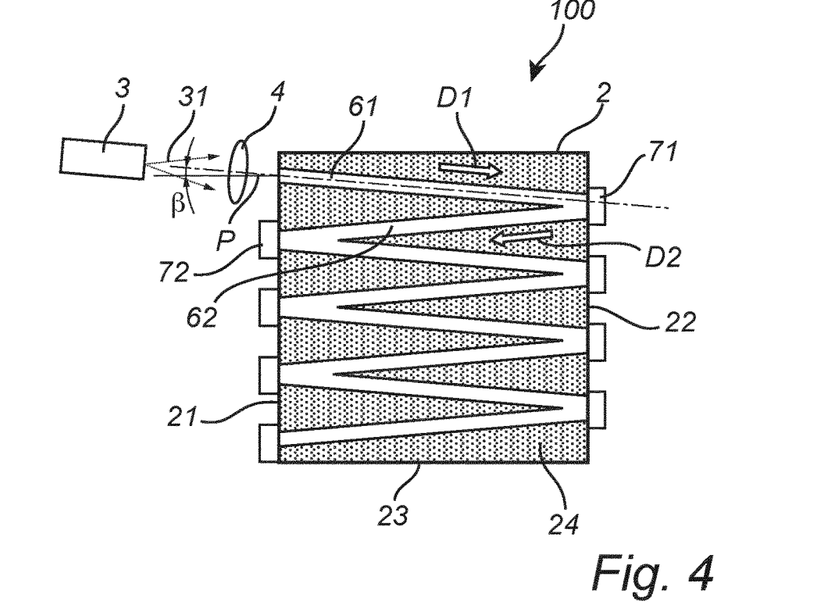
FIG. 4 shows a cross-sectional view of an embodiment of a light emitting device according to the invention comprising a plurality of reflectors, the LEDs being omitted for simplicity.

FIG. 4 shows a light emitting device 100 according to another embodiment of the invention. The light emitting device 100 differs from that of FIG. 3 only in the following features. The light emitting device 100 comprises a plurality of reflectors 71, 72. The reflectors 71, 72 and the red laser diode 3 is positioned in such a way with respect to one another that the red laser light reflected by the at least one reflector, e.g. the reflector 71, propagates in a direction D2 different from a direction opposite to the direction D1 of propagation of the red laser light 31 incident on the reflector 71. As may be seen, some of the plurality of reflectors, e.g. the reflector 72, may be arranged at the first light incoupling surface 21, i.e. on the same side as the red LD 3, but offset from the red LD 3. For instance, the red laser light incident on a reflector 71, 72 may be reflected by the reflector 71, 72 in an angle of reflection ranging from 10 to 60 degrees.

The result is that the red laser light 31 incident on the reflector 71 propagates along a first path 61, while the red laser light reflected by the reflector 71 propagates along a different second path 62. Furthermore, the red laser light incident on the reflector 72 propagates along the second path 62, while the red laser light reflected by the reflector 72 propagates along a different third path. Thereby an appearance corresponding to more than one filament being visible is obtained. As shown in FIG. 4, eight reflectors 71, 72 are provided. In other embodiments another number of reflectors 71, 72 may be provided, such as from two to seven reflectors or more than eight reflectors.

As shown on FIG. 4, the different paths 61, 62 are obtained by placing the red LD 3 such that the laser light 3 propagates in an angle different from perpendicular, particularly an acute angle, β, with the perpendicular, P, to the light incoupling surface 21, and by placing the reflector 71 with its reflecting surface extending in parallel with the second light incoupling surface 22. Alternatively, the red LD 3 may be placed such that the laser light 3 propagates in an angle being perpendicular to the light incoupling surface 21, and by placing the reflector 71 with its reflecting surface extending in an angle with the second light incoupling surface 22, particularly an acute angle with the second light incoupling surface 22.

Figure 5:
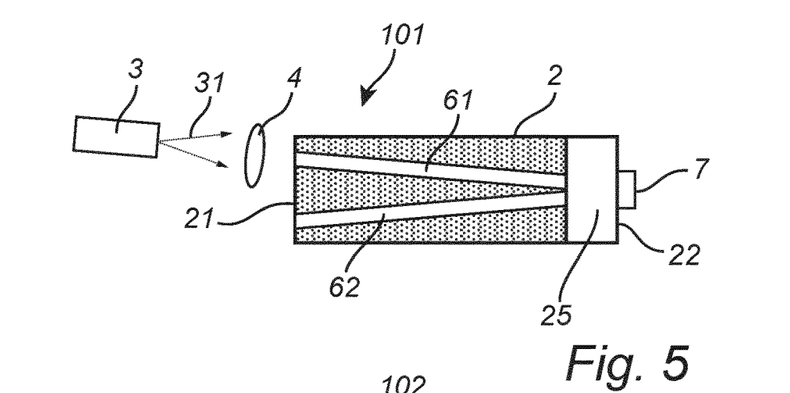
FIG. 5 shows a cross-sectional view of an embodiment of a light emitting device according to the invention comprising a section of an element of a volumetric low scattering material being non-scattering, the LEDs being omitted for simplicity.

FIG. 5 shows a light emitting device 101 according to another embodiment of the invention. The light emitting device 101 differs from those of FIGS. 3 and 4 only in the following features. The light emitting device 101 comprises only one reflector 7 arranged in the manner explained above with reference to the reflector 71 and FIG. 4. The volumetric low scattering material of the element 2 comprises a section 25 adapted for not scattering light. The volumetric low scattering material of the element 2 may also comprise more than one sections 25 adapted for not scattering light. The section 25 may be an end section of the element 2 adjacent to one or both of the light incoupling surfaces 21 and 22.

Figure 6:
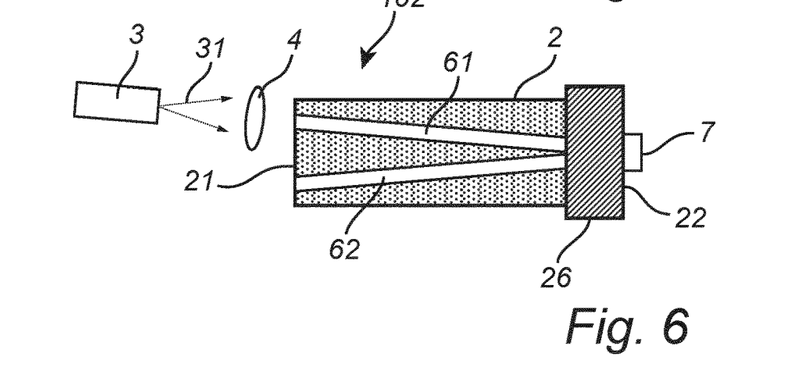
FIG. 6 shows a cross-sectional view of an embodiment of a light emitting device according to the invention comprising a cover covering part of a volumetric low scattering material, the LEDs being omitted for simplicity.

FIG. 6 shows a light emitting device 102 according to another embodiment of the invention. The light emitting device 102 differs from those of FIGS. 3 to 5 only in the following features. The element 2 comprises at least one section being covered by a cover 26 or a coating.

Figure 7:
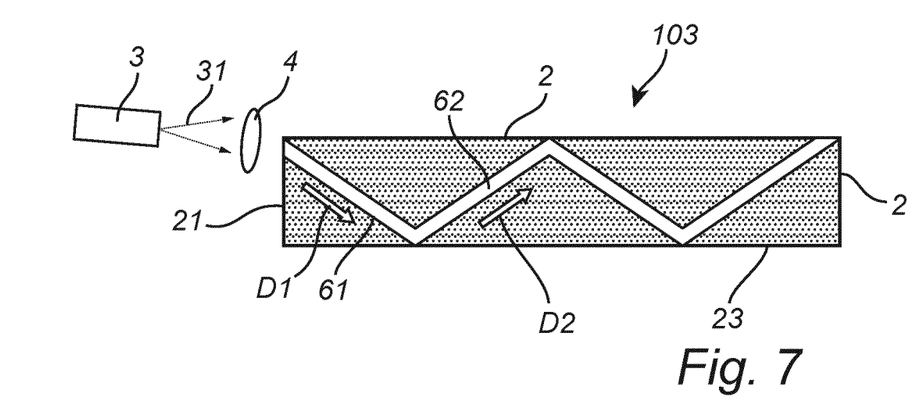
FIG. 7 shows a cross-sectional view of an embodiment of a light emitting device according to the invention in which TIR in a volumetric low scattering material is used instead of a reflector, the LEDs being omitted for simplicity.

FIG. 7 shows a light emitting device 103 according to another embodiment of the invention. The light emitting device 103 differs from those of FIGS. 3 to 6 only in the following features. The red LD 3 is arranged in such an angle with respect to the light incoupling surface 21 that the laser light 31 coupled into the element 2 is reflected inside the element 2 by total internal reflection (TIR) at the circumferential surface 23 of the element 2. Thereby, the use of a reflector 7 may be avoided and a line pattern of paths 61, 62 may be produced.

Figure 8:
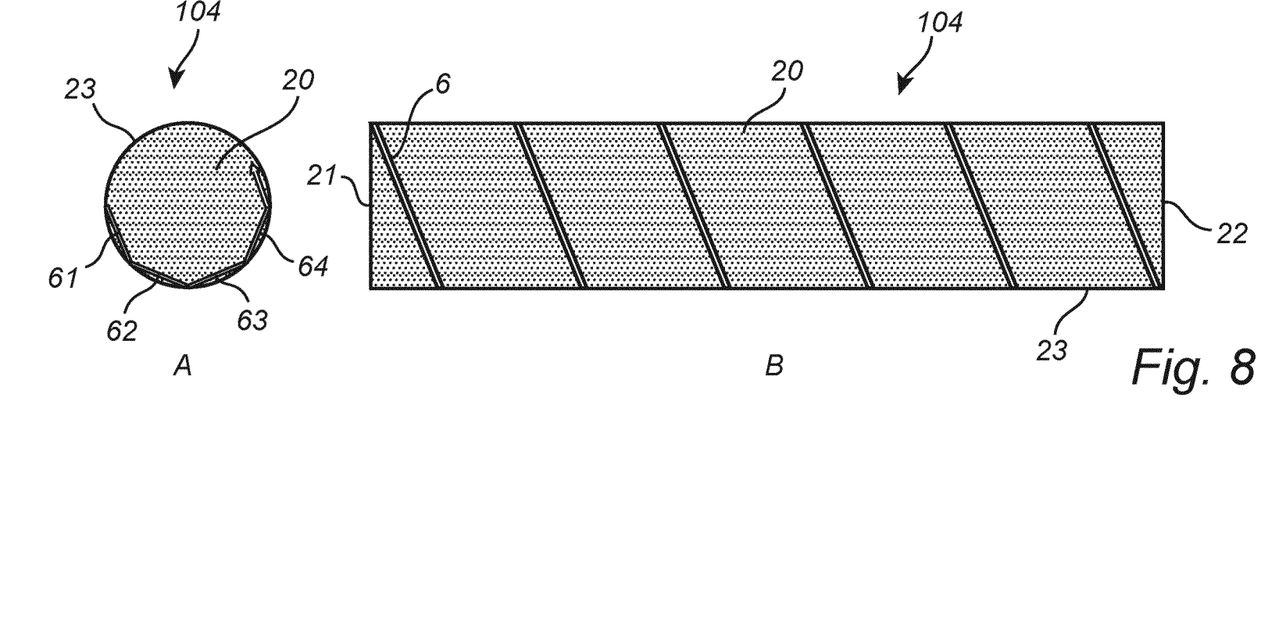
FIGS. 8A and 8B show a transversal (FIG. 8A) and a longitudinal (FIG. 8B) cross-sectional view of an embodiment of a light emitting device according to the invention comprising an element in the form of a light guide with a volumetric low scattering material, the LEDs being omitted for simplicity.

FIG. 8 shows a light emitting device 104 according to another embodiment of the invention. The light emitting device 104 is shown in a transversal cross-section (FIG. 8A) and a longitudinal cross-section (FIG. 8B), respectively. The light emitting device 104 differs from those of FIGS. 3 to 7 only in the following features. The element 2 is in this embodiment provided in the form of a light guide comprising a low scattering material. The light guide is rod-shaped and comprises a circular transversal cross-section (cf. FIG. 8A). Thereby, red laser light 31 from the red LD 3 may be coupled into the light guide in such a manner that it propagates through the light guide by total internal reflection (TIR) at the circumferential surface 23 of the light guide. Thereby a coiled path 6 (cf. FIG. 8B) made up of path segments 61-64 (cf FIG. 8A) may be obtained.

Referring again to FIG. 1, a light emitting device according to any of the embodiments described herein—or indeed a combination of such embodiments—may be used in a luminaire 10 such as a light bulb. The luminaire 10 shown on FIG. 1 comprises by way of a non-limiting example two light emitting devices 1 according to the invention. A luminaire may also comprise one, three or more light emitting devices according to the invention.

The luminaire 10 comprises a luminaire socket 12 and a luminaire base 13, 15 for mechanically and/or electrically connecting the light emitting device 1 to the luminaire socket 12. The luminaire socket 12 may furthermore comprise a terminal 14 for electric connection to a terminal of an external power source.

Therefore, the light emitting device may further comprise a base 8, 16 for connecting the light emitting device to the luminaire base 13, 15 and thereby the luminaire socket 12. The luminaire socket 12 provides electrical power to the LEDs 51, 52, 53 and the red LD 3 of the light emitting device 1, respectively, through the luminaire base 13, 15.

The light emitting device may further comprise an at least partially light transmissive envelope 9 at least partly enclosing at least the volumetric low scattering material of the element 2.

The luminaire base 13, 15, and in particular the luminaire base part 15, may, as shown on FIG. 1, also act as a holder or support for supporting the light emitting device 1.

In another embodiment it may also be feasible to omit the luminaire base 13, 15, in which case at least one of the base 8 and the base 16 of the light emitting device 1 is adapted for connection directly to the luminaire socket 12.

The luminaire 10 may further comprise an enveloping structure or bulb 11 partly or fully enveloping the light emitting device 2. In the embodiment shown, the envelope or bulb 11 is arranged in a distance from light emitting device 2.

Turning now to FIGS. 9-20, different plots of intensity of the light emitted by a light emitting device according to the invention as a function of time is shown. The plots of FIGS. 9-20 illustrate various modes of operation of a light emitting device according to the invention in terms of controlling the intensity of the light emitted by the LD 3 and the at least one LED 5, 51, 52, 53, respectively, over time.

Figure 9:
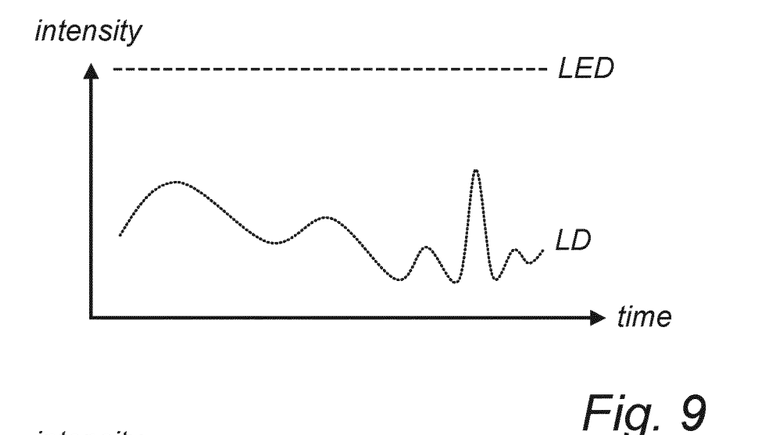
FIGS. 9-20 show different plots of intensity of the light emitted by a light emitting device according to the invention as a function of time and illustrating various modes of operation of a light emitting device according to the invention.

In the mode of operation illustrated in FIG. 9, the intensity of the LED light is not varied while the intensity of the laser light 31 is varied over time. Thereby, a burning light effect may be obtained.

Figure 10:
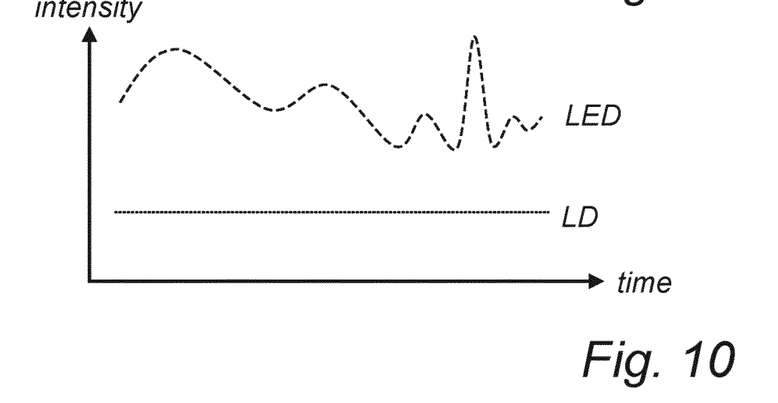

In the mode of operation illustrated in FIG. 10, the intensity of the LED light is varied over time while the intensity of the laser light 31 is not varied. Thereby, a burning light effect may also be obtained.

Figure 11:
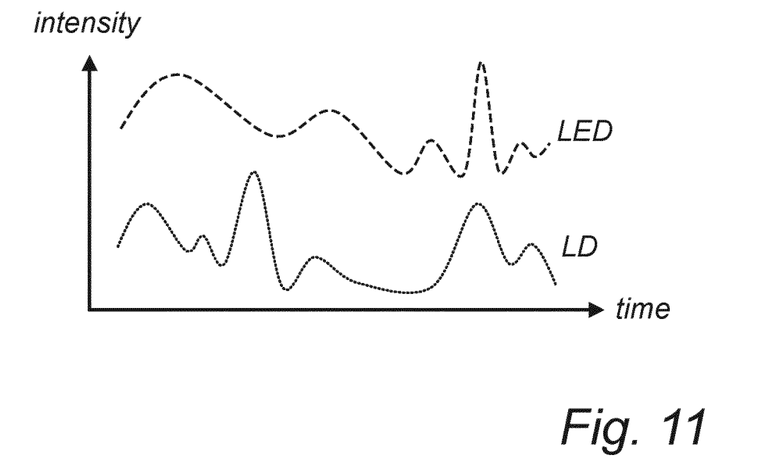

In the mode of operation illustrated in FIG. 11, both the intensity of the LED light and the intensity of the laser light 31 is varied over time, but in a mutually different manner. Thereby, a more randomized variation of the light effect may be obtained.

Figure 12:
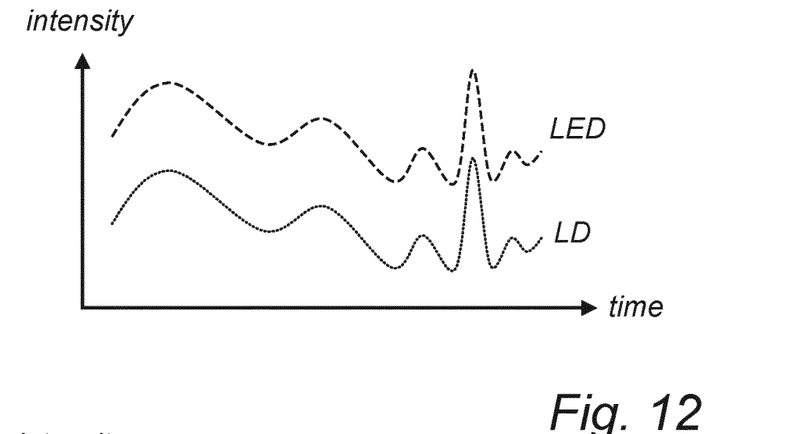

In the mode of operation illustrated in FIG. 12, both the intensity of the LED light and the intensity of the laser light 31 is varied over time, and now following an identical pattern.

Figure 13:
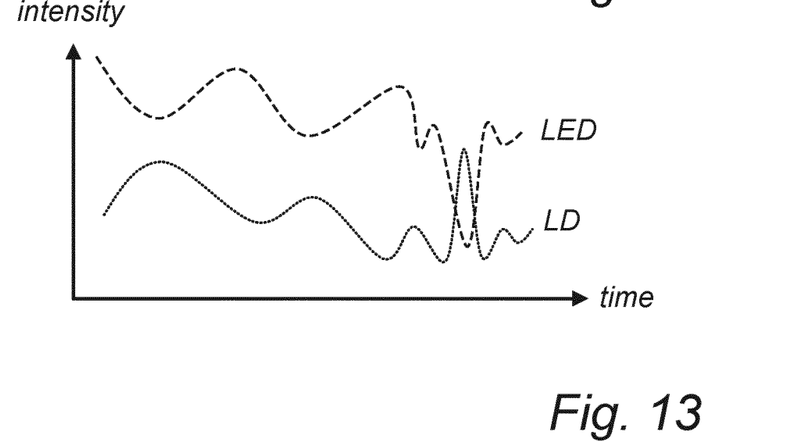

In the mode of operation illustrated in FIG. 13, both the intensity of the LED light and the intensity of the laser light 31 is varied over time, and now following an identical and mutually opposite pattern.

Figure 14:
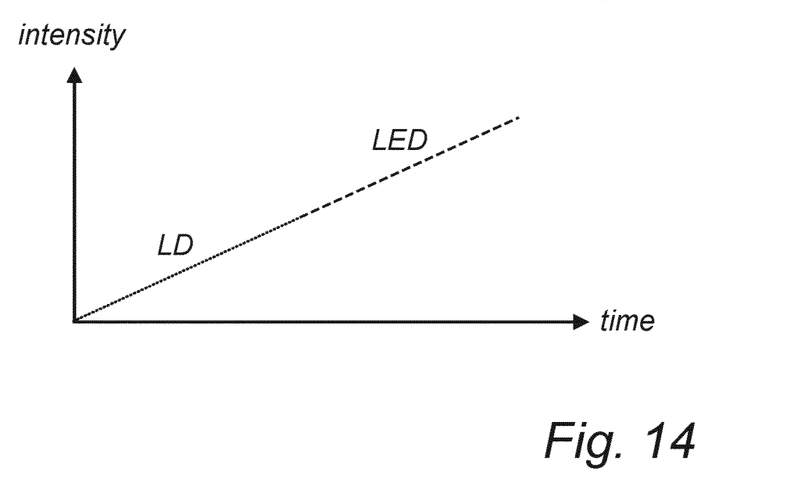

In the mode of operation illustrated in FIG. 14, at low intensities only the LD is on and emitting light at an increasing intensity, while at high intensities only the LEDs are on and emitting light at an increasing intensity.

Figure 15:
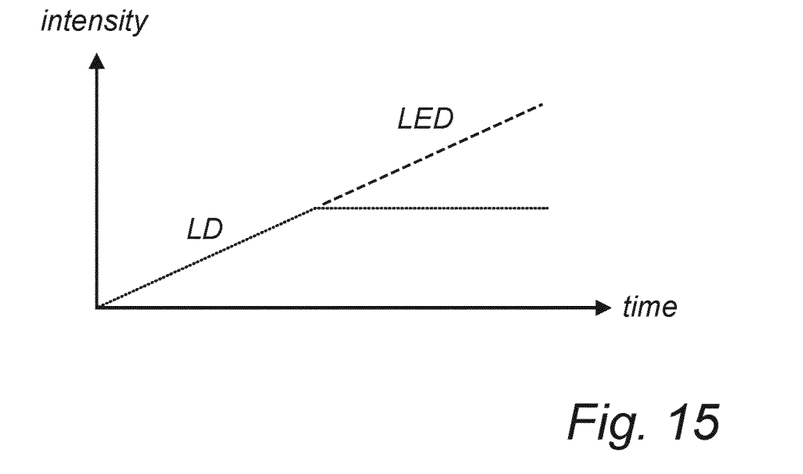

In the mode of operation illustrated in FIG. 15, at low intensities only the LD is on and emitting light at an increasing intensity, while at high intensities the LD is on and emitting light at a constant intensity and the LEDs are on and emitting light at an increasing intensity.

Figure 16:
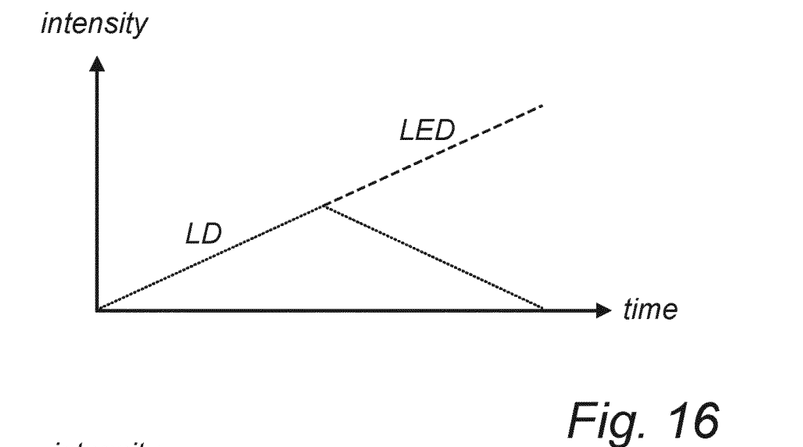

In the mode of operation illustrated in FIG. 16, at low intensities only the LD is on and emitting light at an increasing intensity, while at high intensities the LD is on and emitting light at a decreasing intensity and the LEDs are on and emitting light at an increasing intensity.

Figure 17:
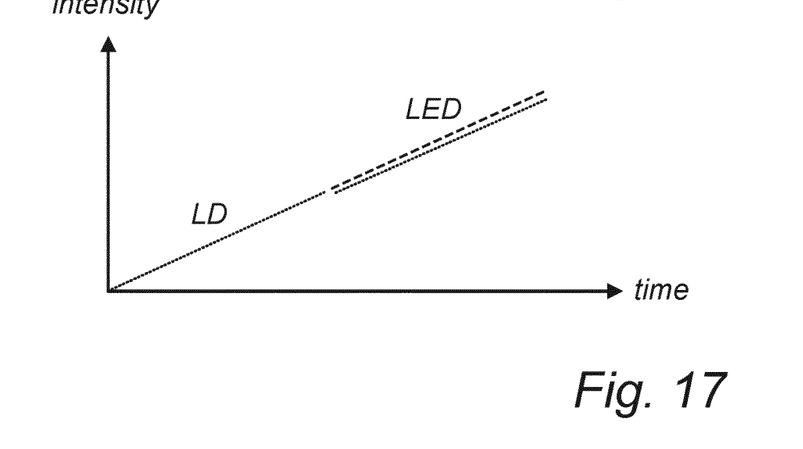

In the mode of operation illustrated in FIG. 17, at low intensities only the LD is on and emitting light at an increasing intensity, while at high intensities both the LD and the LEDs are on and both are emitting light at increasing intensities.

Figure 18:
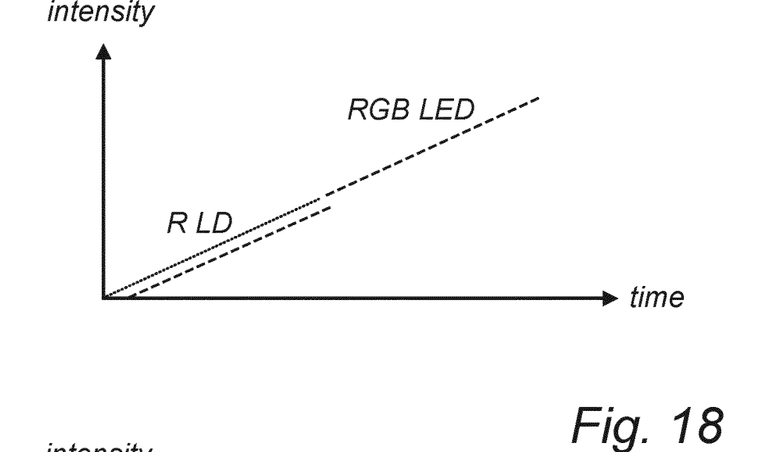

In the mode of operation illustrated in FIG. 18, the light emitting device comprises an RGB LED package. At low intensities, only the LD and the green and blue LEDs are on and emitting light at increasing intensities, while at high intensities the LD is on and emitting light at a constant intensity and the whole RGB LED package is on and emitting light at increasing intensities.

Figure 19:
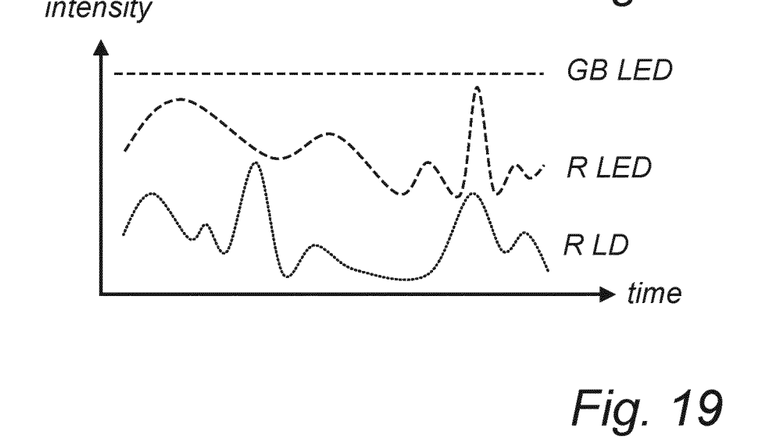

In the mode of operation illustrated in FIG. 19, the light emitting device comprises an RGB LED package. The green and blue LEDs are emitting light at a constant intensity, while the red LED and the LD are emitting light at mutually different varying intensities.

Figure 20:
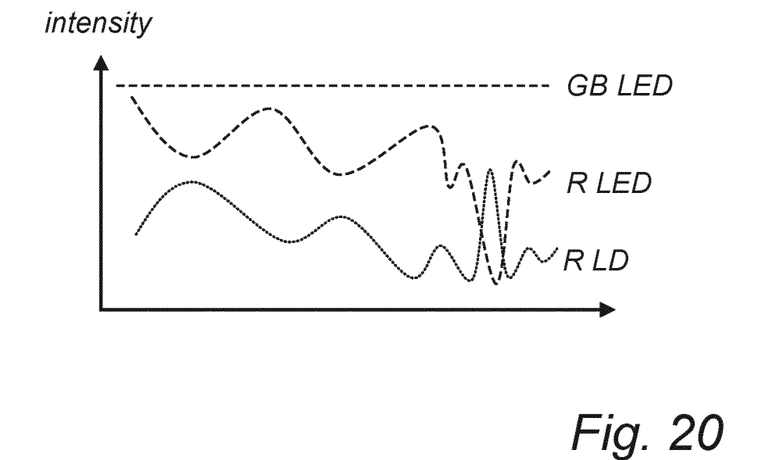

Finally, in the mode of operation illustrated in FIG. 20, the light emitting device comprises an RGB LED package. The green and blue LEDs are emitting light at a constant intensity, while the red LED and the LD are emitting light at mutually opposite varying intensities.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
   an element comprising a volumetric low scattering material, the element comprising opposite first and second light incoupling surfaces and a circumferential surface extending between and connecting the first and second light incoupling surfaces,
   at least one red laser diode configured to emit red laser light in operation, and being arranged at the first light incoupling surface such that the red laser light is coupled into the element through the first light incoupling surface,
   a collimator arranged and configured to collimate the red laser light into collimated red laser light,
   at least one LED configured to emit LED light in operation, the at least one LED being arranged at the second light incoupling surface opposite the first light incoupling surface such that the LED light is coupled into the element through the second light incoupling surface, and
   the volumetric low scattering material of the element being configured to make the path of laser light visible.

2. A light emitting device according to claim 1, wherein the volumetric low scattering material is a solid material comprising particles of a size being less than 1/10 of the wavelength of the red laser light.

3. A light emitting device according to claim 1, wherein the volumetric low scattering material is a solid material comprising particles of a size being larger than the wavelength of the red laser light.

4. A light emitting device according to claim 1, wherein the collimator is configured to provide the collimated red laser light with a collimation of less than 1 degree FWHM.

5. A light emitting device according to claim 4, wherein the element is configured such that the collimated red laser light is visible over a least a length L in the element, wherein L is at least 5 cm.

6. A light emitting device according to claim 1, and further comprising at least one reflector arranged at the second light incoupling surface of the element opposite to the first light incoupling surface at which red laser diode is arranged such as to reflect the red laser light emitted by the red laser diode back into the element.

7. A light emitting device according to claim 6, wherein the at least one reflector and the red laser diode is positioned in such a way with respect to one another that the red laser light reflected by the at least one reflector propagates in a direction different from a direction opposite to the direction of propagation of the red laser light incident on the at least one reflector.

8. A light emitting device according to claim 6, and further comprising at least one reflector arranged at the first light incoupling surface and offset from the red laser diode.

9. A light emitting device according to claim 1, wherein the element comprises at least one section adapted for not scattering light.

10. A light emitting device according to claim 1, wherein the element comprises at least one section being covered by a cover or a coating.

11. A light emitting device according to claim 1, wherein the element is provided in the form of a light guide in which LED light emitted by the at least one light emitting device may be reflected multiple times by total internal reflection, the light guide comprising a low scattering material.

12. A light emitting device according to claim 1, wherein the at least one LED is configured to, in operation, emit any one of white LED light, blue and green/yellow LED light, and red, green and blue LED light.

13. A light emitting device according to claim 1, and further comprising any one or more of:

a base for connecting the light emitting device to one or more of a luminaire base and a luminaire socket, and an at least partially light transmissive envelope at least partly enclosing at least the element of a volumetric low scattering material.

14. A light emitting device according to claim 1, wherein the element comprising a volumetric low scattering material is a rod-shaped element or a filament-shaped element.

15. A luminaire comprising a light emitting device according to claim 1.

* * * * *